(12) United States Patent
Misaizu

(10) Patent No.: US 11,958,230 B2
(45) Date of Patent: Apr. 16, 2024

(54) METHOD FOR PRODUCING RESIN CONTAINER AND DEVICE FOR PRODUCING RESIN CONTAINER

(71) Applicant: NISSEI ASB MACHINE CO., LTD., Nagano (JP)

(72) Inventor: Toshiaki Misaizu, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 23 days.

(21) Appl. No.: 17/763,528

(22) PCT Filed: Sep. 25, 2020

(86) PCT No.: PCT/JP2020/036361
§ 371 (c)(1),
(2) Date: Mar. 24, 2022

(87) PCT Pub. No.: WO2021/060497
PCT Pub. Date: Apr. 1, 2021

(65) Prior Publication Data
US 2022/0281152 A1    Sep. 8, 2022

(30) Foreign Application Priority Data
Sep. 27, 2019    (JP) .................. 2019-177233

(51) Int. Cl.
*B29C 49/64*    (2006.01)
*B29C 49/06*    (2006.01)
(Continued)

(52) U.S. Cl.
CPC .......... *B29C 49/06* (2013.01); *B29C 49/4823* (2013.01); *B29C 49/6427* (2013.01);
(Continued)

(58) Field of Classification Search
CPC .... B29C 2949/0773; B29C 2949/0776; B29C 2949/0744; B29C 2949/0722; B29C 49/6427
See application file for complete search history.

(56) References Cited

U.S. PATENT DOCUMENTS 5,242,066 A  * 9/1993 Kelsey .................... B65D 1/04
                                                        215/6
2004/0262321 A1* 12/2004 Takeda ................ B29C 49/071
                                                        220/675
(Continued)

FOREIGN PATENT DOCUMENTS

EP    2210816 A1 *  7/2010 ............ B65D 1/023
JP    6-270235       9/1994
(Continued)

OTHER PUBLICATIONS

International Search Report issued in International Patent Application No. PCT/JP2020/036361, dated Dec. 1, 2020, along with an English translation thereof.
(Continued)

*Primary Examiner* — Robert B Davis
(74) *Attorney, Agent, or Firm* — Greenblum & Bernstein, P.L.C.

(57) ABSTRACT

A manufacturing method includes an injection molding process of injection-molding a preform, a temperature adjustment process of temperature-adjusting the preform while cooling the preform, and a blow molding process of blow-molding the temperature-adjusted preform to manufacture a resin container. In the injection molding process, a step portion thicker than at least an engagement groove of a neck portion is formed between the neck portion and a body portion of the preform.

6 Claims, 9 Drawing Sheets

(51) Int. Cl.
*B29C 49/48* (2006.01)
*B29C 49/12* (2006.01)
*B29K 105/00* (2006.01)
*B29L 31/00* (2006.01)

(52) U.S. Cl.
CPC ...... *B29C 49/12* (2013.01); *B29C 2949/0715* (2022.05); *B29C 2949/0744* (2022.05); *B29C 2949/0773* (2022.05); *B29K 2105/253* (2013.01); *B29L 2031/712* (2013.01)

(56) References Cited

U.S. PATENT DOCUMENTS

| | | | | |
|---|---|---|---|---|
| 2004/0262818 | A1* | 12/2004 | Takeuchi | B29C 49/071 264/537 |
| 2008/0241447 | A1* | 10/2008 | Shi | B65D 1/0215 428/35.7 |
| 2010/0116777 | A1* | 5/2010 | Ishii | B29B 11/14 215/381 |
| 2010/0304168 | A1* | 12/2010 | Dornbach | B29C 49/071 428/542.8 |
| 2014/0131920 | A1 | 5/2014 | Nakahara | |
| 2016/0361860 | A1 | 12/2016 | Nakahara | |
| 2018/0001539 | A1 | 1/2018 | Horigome et al. | |
| 2018/0079122 | A1 | 3/2018 | Aoki et al. | |
| 2018/0079127 | A1 | 3/2018 | Aoki | |
| 2019/0337218 | A1 | 11/2019 | Kawamura et al. | |
| 2020/0108542 | A1 | 4/2020 | Horigome et al. | |

FOREIGN PATENT DOCUMENTS

| | | |
|---|---|---|
| JP | 2005-7797 A | 1/2005 |
| JP | 2010-208686 | 9/2010 |
| JP | 2017-109472 A | 6/2017 |
| JP | 2019-147393 A | 9/2019 |
| WO | 96/30189 | 10/1996 |
| WO | 2013/012067 A1 | 1/2013 |
| WO | 2016/148189 A1 | 9/2016 |
| WO | 2017/002150 A1 | 5/2017 |
| WO | 2017/098673 A1 | 6/2017 |

OTHER PUBLICATIONS

Written Opinion of the International Searching Authority issued in International Application No. PCT/JP2020/036361, dated Dec. 1, 2020 along with an English translation thereof.
Office Action Issued in Corresponding CN Patent Application No. 202080073509.2, dated Apr. 27, 2023, along with an English translation thereof.
Qiyou, Huang, Development of Aoki Direct Temperature Regulating Injection Stretching Blow Molding Machine, Foreign Plastics (1996), p. 29-35, along with an English translation thereof.

* cited by examiner

METHOD FOR PRODUCING RESIN CONTAINER AND DEVICE FOR PRODUCING RESIN CONTAINER

TECHNICAL FIELD

The present disclosure relates to a manufacturing method for manufacturing a resin container and a manufacturing apparatus for manufacturing the resin container.

BACKGROUND ART

A hot parison type blow molding method is a method in which blow molding is performed by using residual heat during injection molding of a preform, and, as compared with a cold parison type blow molding method, can manufacture a variety of containers with excellent aesthetic appearance. There are two types of hot parison type blow molding machines, one provided with a temperature adjustment part between an injection molding part and a blow molding part (4 station type) and the other without the temperature adjustment part (2 station type and 3 station type). When the temperature adjustment part is provided, generally, it is easy to adjust a temperature condition of the preform before blowing to a temperature condition suitable for shaping a final container.

For the hot parison type blow molding machine, various methods and apparatuses have been developed for the purpose of shortening a molding cycle. For example, a time required for opening and closing an injection molding mold or raising and lowering a stretch device is shortened in Patent Literature 1 and Patent Literature 2, a method for controlling an injection device is changed in Patent Literature 3, and a preform shape that can be demolded early and an injection molding mold therefor are adopted in Patent Literature 4 to shorten the molding cycle.

CITATION LIST

Patent Literature

Patent Literature 1: JP-A-2005-007797
Patent Literature 2: WO-A1-2016-148189
Patent Literature 3: WO-A1-2017-002150
Patent Literature 4: WO-A1-2017-098673

SUMMARY OF INVENTION

Technical Problem

For the purpose of shortening the molding cycle, in addition to the techniques described in Patent Literatures 1 to 4, a technique of shortening the molding cycle time by shortening a cooling time of the preform in an injection molding process and performing post-cooling in a temperature adjustment process has been developed. However, the present inventors have found, as a technical problem, that, in a container manufactured by blow molding by this method, a resin residue defect due to insufficient stretch during blow molding is likely to occur in a shoulder portion thereof, and a thickness distribution of the container tends not to be appropriately formed, resulting in a decrease in aesthetic appearance and physical properties.

Therefore, an object of the present disclosure is to provide a manufacturing method for manufacturing a resin container and a manufacturing apparatus for manufacturing a resin container, in which a molding cycle time is shortened by performing post-cooling in a temperature adjustment process and a resin residue defect is unlikely to occur in a shoulder portion of the container.

Solution to Problem

In order to achieve the above object, the present disclosure provides a manufacturing method for manufacturing a resin container, the manufacturing method including:

an injection molding process of injection-molding a resin preform including a neck portion and a body portion;

a temperature adjustment process of temperature-adjusting the injection-molded preform while cooling the injection-molded preform; and a blow molding process of blow-molding the temperature-adjusted preform to manufacture the resin container, in which in the injection molding process, a step portion thicker than at least an engagement groove of the neck portion is formed between the neck portion and the body portion of the preform, an outer diameter of the step portion being larger than at least an outer diameter of the engagement groove of the neck portion, and in which in the blow molding process, the preform is blow-molded such that at least a part of the step portion remains between a neck portion and a shoulder portion of a container blow-molded based on the preform.

According to the above method, in the blow molding process, the preform including the step portion in a state where residual heat is high is stretched and blown such that at least a part of the step portion remains between the neck portion and the shoulder portion of the container, and therefore stretch blow can be favorably performed from the neck portion to the shoulder portion of the container.

As described above, according to the above method, it is possible to provide a manufacturing method in which a molding cycle time is shortened by performing post-cooling in the temperature adjustment process, and a resin residue defect is unlikely to occur in the shoulder portion of the container.

Further, the present disclosure provides a manufacturing apparatus for manufacturing a resin container, the manufacturing apparatus including:

an injection molding part configured to injection-mold a resin preform including a neck portion and a body portion;

a temperature adjustment part configured to temperature-adjust the injection-molded preform while cooling the injection-molded preform; and a blow molding part configured to blow-mold the temperature-adjusted preform to manufacture the resin container, in which the injection molding part is configured to form a step portion thicker than the neck portion between the neck portion and the body portion of the preform, an outer diameter of the step portion being larger than at least an outer diameter of an engagement groove of the neck portion of the preform, and in which the temperature adjustment part is configured to simultaneously cool the body portion of the preform from an inner side and an outer side of the body portion, and the blow molding part is configured to blow-mold the preform such that at least a part of the step portion remains between a neck portion and a shoulder portion of a container blow-molded based on the preform.

According to the above configuration, in the blow molding part, the preform including the step portion in a state where residual heat is high is stretched and blown such that at least a part of the step portion remains between the neck portion and the shoulder portion of the container, and therefore stretch blow can be favorably performed from the neck portion to the shoulder portion of the container.

As described above, according to the above configuration, it is possible to provide the manufacturing apparatus in which a molding cycle time is shortened by performing post-cooling in the temperature adjustment part, and a resin residue defect is unlikely to occur in the shoulder portion of the container.

Advantageous Effects of Invention

According to the present disclosure, it is possible to provide a manufacturing method for manufacturing a resin container and a manufacturing apparatus for manufacturing a resin container in which a molding cycle time is shortened by performing post-cooling in a temperature adjustment process and a resin residue defect is unlikely to occur in a shoulder portion of the container.

DESCRIPTION OF EMBODIMENTS

Figure 1:
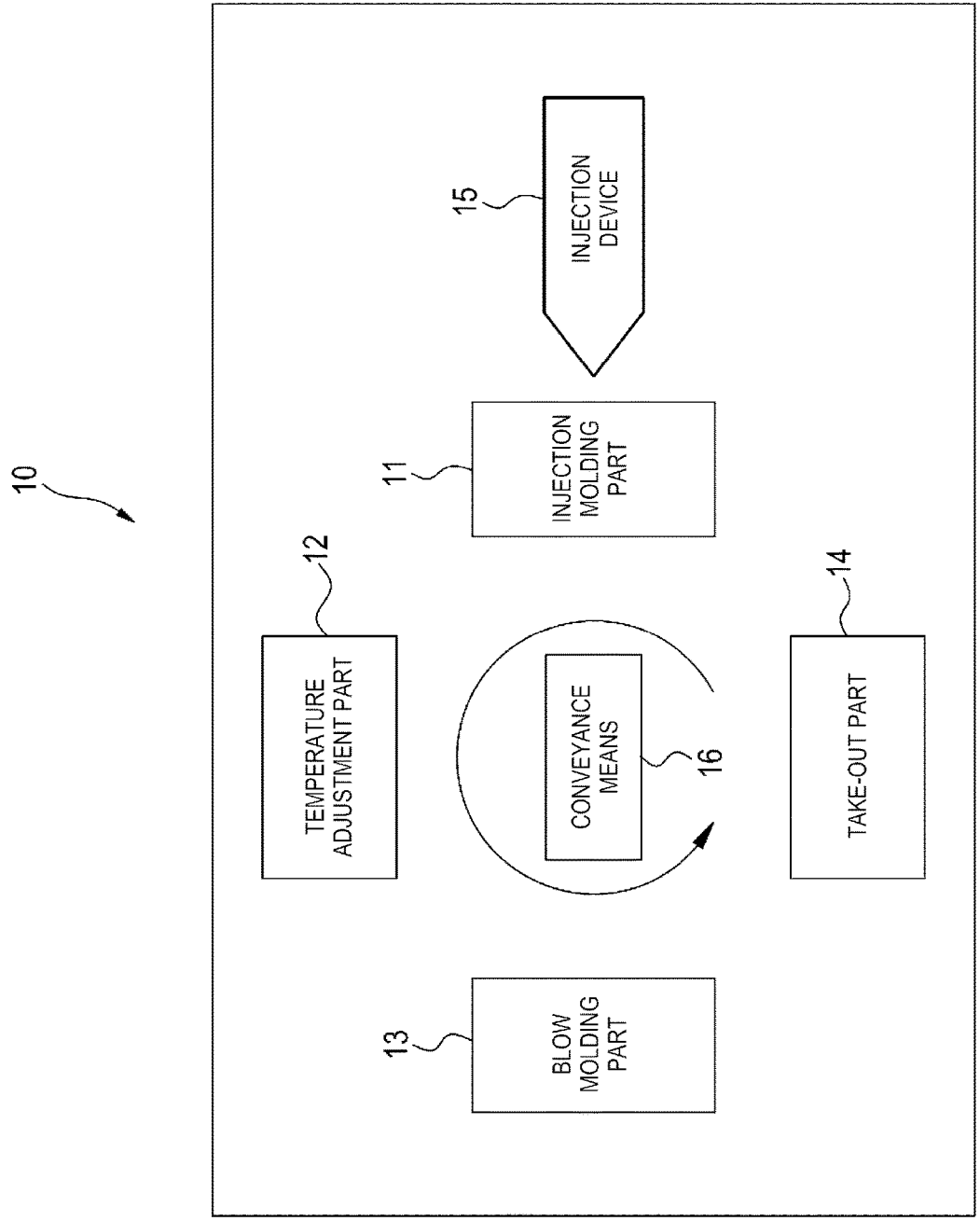
FIG. 1 is a schematic diagram showing a manufacturing apparatus for manufacturing a resin container according to an embodiment of the present disclosure.

Hereinafter, an embodiment of the present disclosure will be described with reference to the drawings. Dimensions of members shown in the drawings may be different from actual dimensions of the members for convenience of explanation.

A manufacturing apparatus 10 for manufacturing a resin container according to an embodiment will be described with reference to FIGS. 1 to 5.

FIG. 1 is a schematic diagram showing the manufacturing apparatus 10 for manufacturing the resin container. As shown in FIG. 1, the manufacturing apparatus 10 for manufacturing the resin container includes an injection molding part 11 for injection-molding a preform of the resin container, and a temperature adjustment part 12 for adjusting a temperature of the formed preform. An injection device 15 that supplies a resin material, which is a raw material of the resin container, is connected to the injection molding part 11. Further, the manufacturing apparatus 10 for manufacturing the resin container includes a blow molding part 13 for manufacturing the resin container by blowing the temperature-adjusted preform, and a take-out part 14 for taking out the manufactured resin container.

Figure 2:
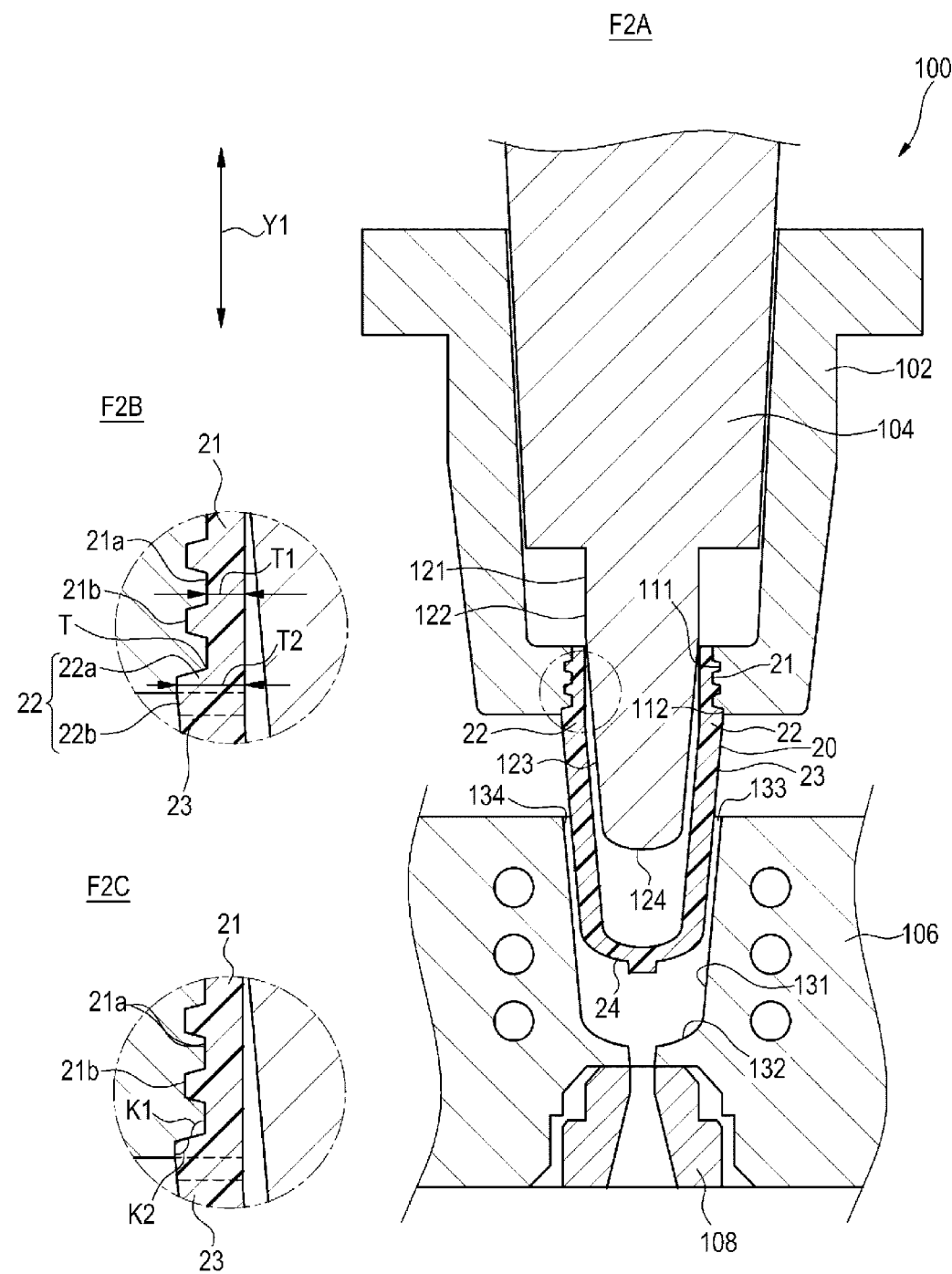
FIG. 2 is a view illustrating an injection molding mold that constitutes an injection molding part.
Figure 3:
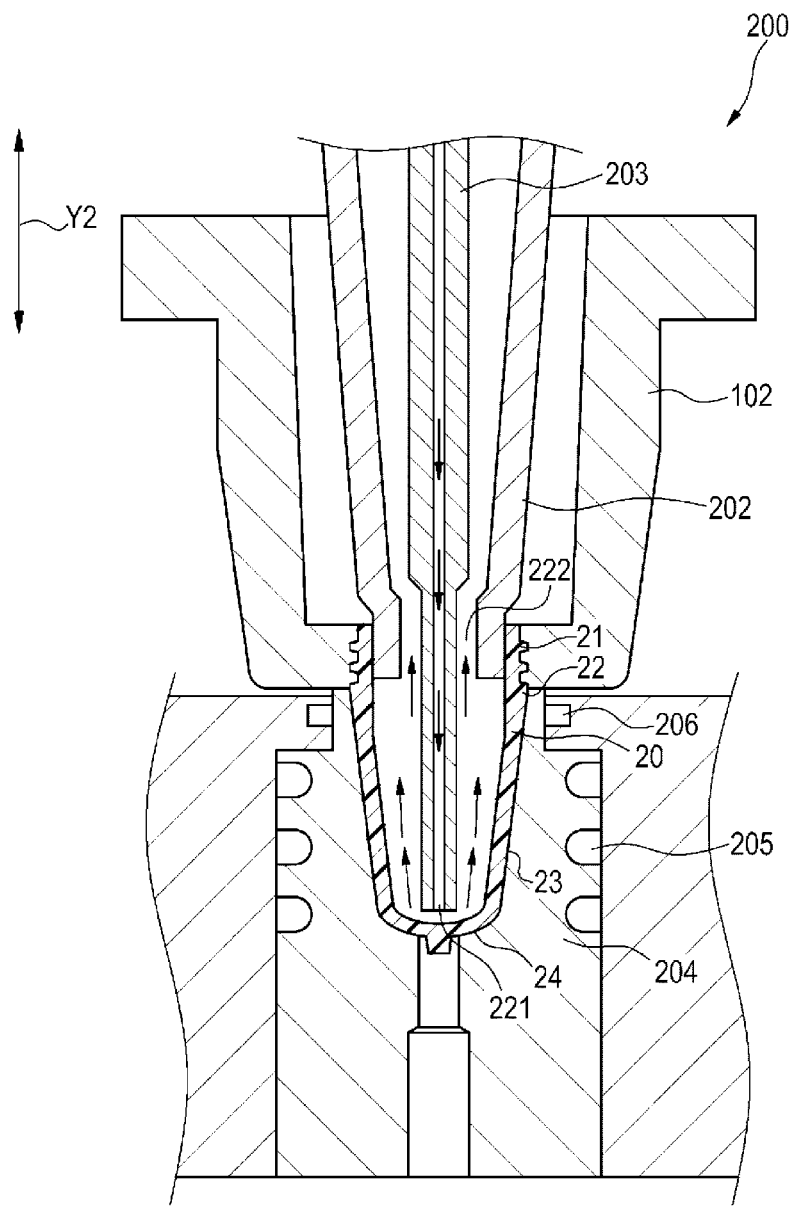
FIG. 3 is a view illustrating a temperature adjustment mold that constitutes a temperature adjustment part.
Figure 4:
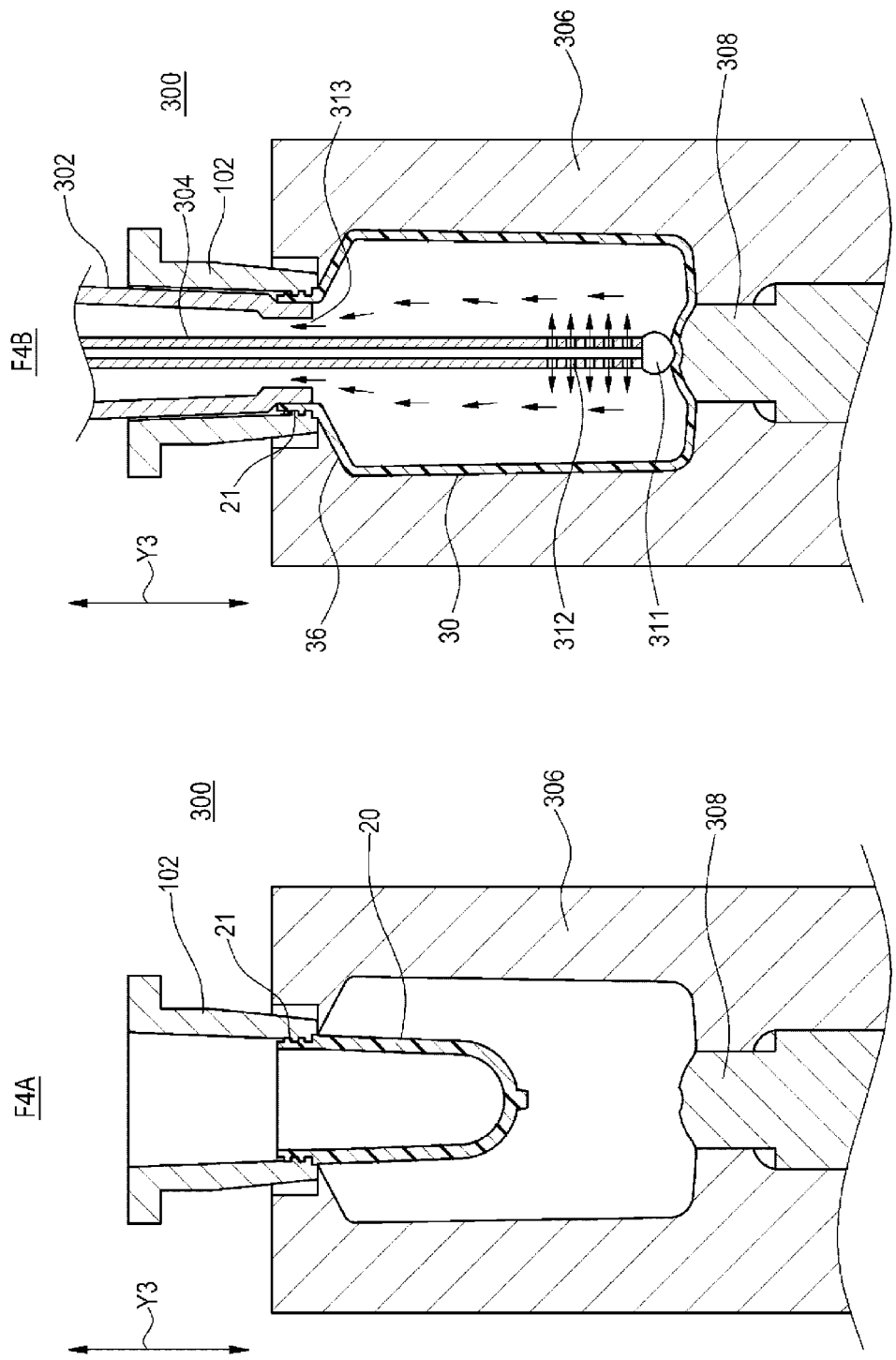
FIG. 4 is a view illustrating a blow molding mold that constitutes a blow molding part.

The preform and the resin container are conveyed by a conveyance means 16 in an order of the injection molding part 11, the temperature adjustment part 12, the blow molding part 13, and the take-out part 14 in the manufacturing apparatus 10 for manufacturing the resin container. The injection molding part 11, the temperature adjustment part 12, the blow molding part 13, and the take-out part 14 are provided at positions rotated by a predetermined angle (90 degrees in the present embodiment) around the conveyance means 16. The conveyance means 16 includes, for example, a rotation plate and the like, and conveys the preform and the resin container to each of the parts in accordance with rotation of the rotation plate. As shown in FIGS. 2 to 4, the preform and the resin container are conveyed to each of the parts with rotation of the rotation plate in a state where a neck portion 21 is supported by a neck mold 102 attached to the rotation plate. The manufacturing apparatus 10 for manufacturing the resin container is a hot parison type manufacturing apparatus in which the temperature adjustment part 12 is provided between the injection molding part 11 and the blow molding part 13, and continuously performs manufacturing of the preform and the resin container.

FIG. 2 is a cross-sectional view of an injection molding mold 100 that constitutes the injection molding part 11. As shown in F2A of FIG. 2, the injection molding mold 100 includes the neck mold 102, an injection core mold 104, and an injection cavity mold 106. The injection molding mold 100 is configured to form a preform 20 by pouring (filling with a molten resin) a synthetic resin material such as a polyester-based resin (for example, polyethylene terephthalate (PET)) into a cavity formed by clamping these molds.

The preform 20 includes the neck portion 21, a step portion 22 continuous with the neck portion 21, a body portion 23 continuous with the step portion 22, and a bottom portion 24 continuous with the body portion 23. The step portion 22 is an intermediate connection portion provided between the neck portion 21 and the body portion 23, and is a portion that protrudes in an outer diameter direction from a lower end T of the neck portion 21. As shown in F2B (partially enlarged view) of FIG. 2, a thickness T2 of the step portion 22 is formed to be thicker than at least a thickness T1 of an engagement groove 21a of the neck portion 21. The thickness T2 of the step portion 22 may be the same as a thickness of an engagement protrusion 21b, or may be thicker or thinner than the thickness of the engagement protrusion 21b. Further, an outer diameter of the step portion 22 is formed to be larger than at least an outer diameter of the engagement groove 21a of the neck portion 21. The outer diameter of the step portion 22 may be the same as the outer diameter of the engagement protrusion 21b, or may be larger or smaller than the outer diameter of the engagement protrusion 21b. Further, as shown in F2C (partially enlarged view) of FIG. 2, a first corner portion is provided between an outer wall surface of a lower portion of the neck portion 21 (a lower portion of the lowermost engagement protrusion 21b) and an upper surface of the step portion 22, and an angle K1 thereof is set to, for example, 90° to 110°. Further, a second corner portion is provided between the upper surface and a side surface of the step portion 22, and an angle K2 thereof is set to, for example, 80° to 100°.

The step portion 22 of the preform 20 includes an upper step portion 22a defined by a part of a lower cavity surface of the neck mold 102 and a lower step portion 22b defined by a part of an upper cavity surface of the injection cavity mold 106. The upper step portion 22a is formed between the neck portion 21 and the lower step portion 22b. The lower step portion 22b is formed between the upper step portion 22a and the body portion 23. As shown in F2B of FIG. 2, in the present example, a length of the upper step portion 22a in an upper-lower direction is substantially the same as a length of the lower step portion 22b in the upper-lower direction. A boundary between the upper step portion 22a and the lower step portion 22b is located at a position corresponding to a parting surface between a bottom surface of the neck mold 102 and an upper surface of the injection cavity mold 106. Therefore, at the boundary, a trace corresponding to a parting line may be formed so as to be observable. The upper step portion 22a may be set to a region of 1.5 mm to 2.0 mm of an upper portion of the step portion 22 whose base end is a lower end T of the neck portion 21, and the lower step portion 22b may be set to a region of 1.5 mm connected thereto.

In the present example, an outer wall surface of the step portion 22 and an outer wall surface of the body portion 23 are connected to each other, and are formed so as to be, for example, in a state of being substantially flush with each other or in a state of being provided with a gently reduced diameter portion (for example, a tapered shape) in the middle thereof Further, the body portion 23 is formed such that an inner wall surface thereof is gradually inclined toward a center side of the preform 20 as it goes toward the bottom portion 24 of the preform 20, and an inner diameter of the body portion 23 is gradually reduced as it goes toward the bottom portion 24 of the preform 20.

The neck mold 102 includes an outer neck defining portion 111 that is a cavity surface that defines an outer shape of the neck portion 21 of the preform 20, and an outer step defining portion 112 that is a cavity surface that defines an outer shape of the upper step portion 22a of the step portion 22 of the preform 20. An inner diameter of the outer step defining portion 112 is formed to be at least larger than an inner diameter of a portion of the outer neck defining portion 111 that defines the engagement groove 21a of the neck portion 21. The inner diameter of the outer step defining portion 112 may be the same as an inner diameter of a portion of the outer neck defining portion 111 that defines the engagement protrusion 21b of the neck portion 21, or may be larger or smaller than the inner diameter of the portion that defines the engagement protrusion 21b.

The injection core mold 104 includes an inner neck defining portion 121 that defines an inner shape of the neck portion 21 of the preform 20, an inner step defining portion 122 that defines an inner shape of the step portion 22 of the preform 20, an inner body defining portion 123 that defines an inner shape of the body portion 23 of the preform 20, and an inner bottom defining portion 124 that defines an inner shape of the bottom portion 24 of the preform 20. The inner step defining portion 122 is continuous with the inner neck defining portion 121, the inner body defining portion 123 is continuous with the inner step defining portion 122, and the inner bottom defining portion 124 is continuous with the inner body defining portion 123. A part of the injection core mold 104 including the inner neck defining portion 121, the inner step defining portion 122, the inner body defining portion 123, and the inner bottom defining portion 124 is tapered. The injection core mold 104 is configured to be movable up and down in an upper-lower direction Y1 in FIG. 2. The injection core mold 104 shown in FIG. 2 is in a state where the injection core mold 104 is being lifted upward after formation of the preform 20 is finished.

The injection cavity mold 106 includes an outer body defining portion 131 that defines an outer shape of the body portion 23 of the preform 20, an outer bottom defining portion 132 that defines an outer shape of the bottom portion 24 of the preform 20, an opening portion 133 located on a side opposite to the outer bottom defining portion 132 across the outer body defining portion 131, and an outer step defining portion 134 that is a cavity surface that defines an outer shape of the lower step portion 22b of the step portion 22. A hot runner 108 is connected to a lower portion of the injection cavity mold 106. The hot runner 108 is connected to the injection device 15. Molten resin such as PET is filled from the injection device 15 via the hot runner 108.

FIG. 3 is a cross-sectional view of a temperature adjustment mold 200 that constitutes the temperature adjustment part 12. As shown in FIG. 3, the temperature adjustment mold 200 includes the neck mold 102, a temperature adjustment core mold (temperature adjustment blow core mold) 202, an air introduction rod 203, and a temperature adjustment cavity mold 204. The neck mold 102 is a common neck mold that moves to a position of the temperature adjustment mold 200 in a state where the preform 20 formed by the injection molding part 11 is held.

The temperature adjustment core mold 202 is configured to be movable up and down in an upper-lower direction Y2 in FIG. 3. As shown in FIG. 3, when the temperature adjustment core mold 202 is lowered and inserted into the neck mold 102 in a state where the neck mold 102 and the temperature adjustment cavity mold 204 are clamped, the temperature adjustment core mold 202 is configured to fit into or abut against the neck portion 21 of the preform 20. Accordingly, air inside the preform 20 can be prevented from leaking from the neck portion 21 to an outside of the temperature adjustment core mold 202.

The air introduction rod 203 is configured to be movable up and down in the upper-lower direction Y2 in FIG. 3 inside the temperature adjustment core mold 202. A first inner flow port 221 that can jet or discharge air (supply air or discharge air: supply or discharge) is provided at a tip end of the air introduction rod 203.

A gap between the temperature adjustment core mold 202 and the air introduction rod 203 is a flow path for supplying or discharging air to and from the preform 20. A gap formed between a tip end of the temperature adjustment core mold 202 and the air introduction rod 203 constitutes a first outer flow port 222 that can jet or suck air. The first inner flow port 221 and the first outer flow port 222 may be an air blowing port and a discharge port, respectively.

The temperature adjustment cavity mold 204 accommodates the preform 20 formed by the injection molding part 11. A cooling medium circulation path 205 is provided inside the temperature adjustment cavity mold 204. A cooling medium such as water flows through the cooling medium circulation path 205. The temperature adjustment mold 200 is configured to accommodate the preform 20 formed by the injection molding part 11 in the temperature adjustment cavity mold 204 and adjust a temperature of the preform 20 while cooling the preform 20 to a temperature suitable for blow molding. A temperature of the cooling medium that flows through the cooling medium circulation path 205 is set to, for example, about 10° C. to about 65° C.

The temperature adjustment mold 200 adjusts a temperature by cooling the neck portion 21, the step portion 22, the body portion 23, and the bottom portion 24 of the injection-molded preform 20 simultaneously from an inside and an outside by the air blown from the air introduction rod 203 and direct cooling by the temperature adjustment cavity mold 204.

A heater 206 may be provided in an upper portion of the temperature adjustment cavity mold 204 facing the step portion 22. The heater 206 is not for heating the body portion 23.

FIG. 4 is a cross-sectional view of a blow molding mold 300 that constitutes the blow molding part 13. F4A in FIG. 4 shows a state where the preform 20 is accommodated in the blow molding mold 300. F4B in FIG. 4 shows a state where the preform 20 is expanded to a shape of a resin container 30.

As shown in F4A and F4B of FIG. 4, the blow molding mold 300 includes the neck mold 102, a blow core mold 302, a stretch rod 304, a blow cavity mold 306, and a bottom mold 308. The neck mold 102 is a common neck mold that moves to a position of the blow molding mold 300 in a state where the preform 20 temperature-adjusted by the temperature adjustment part 12 is held. The blow molding mold 300 forms the resin container 30 by, while stretching the preform 20 temperature-adjusted by the temperature adjustment part 12 by the stretch rod 304, introducing air from the blow core mold 302 to expand the preform 20 in a shape defined by the blow cavity mold 306 and the bottom mold 308.

Since the blow cavity mold 306 and the bottom mold 308 are clamped, outer shapes of a side surface and a bottom surface of the resin container 30 are defined. The bottom mold 308 is disposed at a lower center of a molding space of the blow cavity mold 306.

The stretch rod 304 is configured to be movable up and down in an upper-lower direction Y3 in FIG. 4 inside the blow core mold 302. A tip end of the stretch rod 304 is provided with an abutment portion 311 that is in contact with an inner bottom surface of the preform 20 to prevent misalignment during stretching A second inner flow port 312 that can jet air is formed in an outer peripheral surface of the stretch rod 304.

When the blow core mold 302 is inserted into the neck mold 102 in a state of F4A in FIG. 4 in which the neck mold 102, the blow cavity mold 306, and the bottom mold 308 are clamped, the blow core mold 302 is configured to fit into or abut against the neck portion 21 of the preform 20. Accordingly, it is possible to prevent air inside the preform 20 from leaking from the neck portion 21 to an outside of the blow core mold 302.

A gap between the stretch rod 304 and the blow core mold 302 is a flow path for supplying and discharging air to and from the preform 20. A gap formed by a tip end of the blow core mold 302 and the stretch rod 304 constitutes a second outer flow port 313 that can suck air. The stretch rod 304 is configured to be able to jet air into the preform 20 from the second inner flow port 312. The second inner flow port 312 is an air blowing port, and the second outer flow port 313 is a discharge port.

Figure 5:
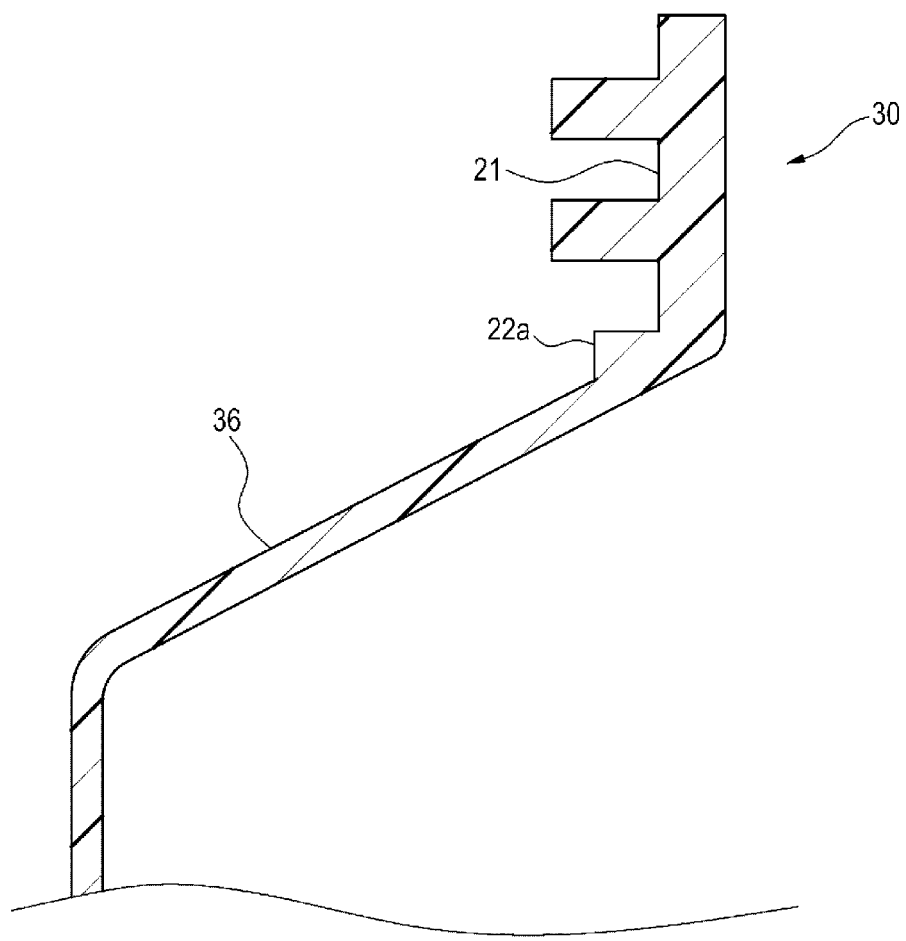
FIG. 5 is a view showing a step portion that remains on the blow-molded resin container.

FIG. 5 is a cross-sectional view of the blow-molded resin container 30. As shown in FIG. 5, the resin container 30 includes the upper step portion 22a between the neck portion 21 and a shoulder portion 36. The upper step portion 22a is a part of the step portion 22 formed on the preform 20 during injection molding of the preform 20. The blow molding part 13 blow-molds the preform 20 such that at least a part of the step portion 22 formed during injection molding of the preform 20 remains between the neck portion 21 and the shoulder portion 36 of the resin container 30. Examples of a phenomenon in which at least a part of the step 22 remains between the neck portion 21 and the shoulder portion 36 of the resin container 30 include an example in which a trace (line) of the step portion 22 remains on the shoulder portion 36 of the resin container 30.

The take-out part 14 is configured to take out the resin container 30 by releasing the neck portion 21 of the resin container 30 from the neck mold 102.

Figure 6:
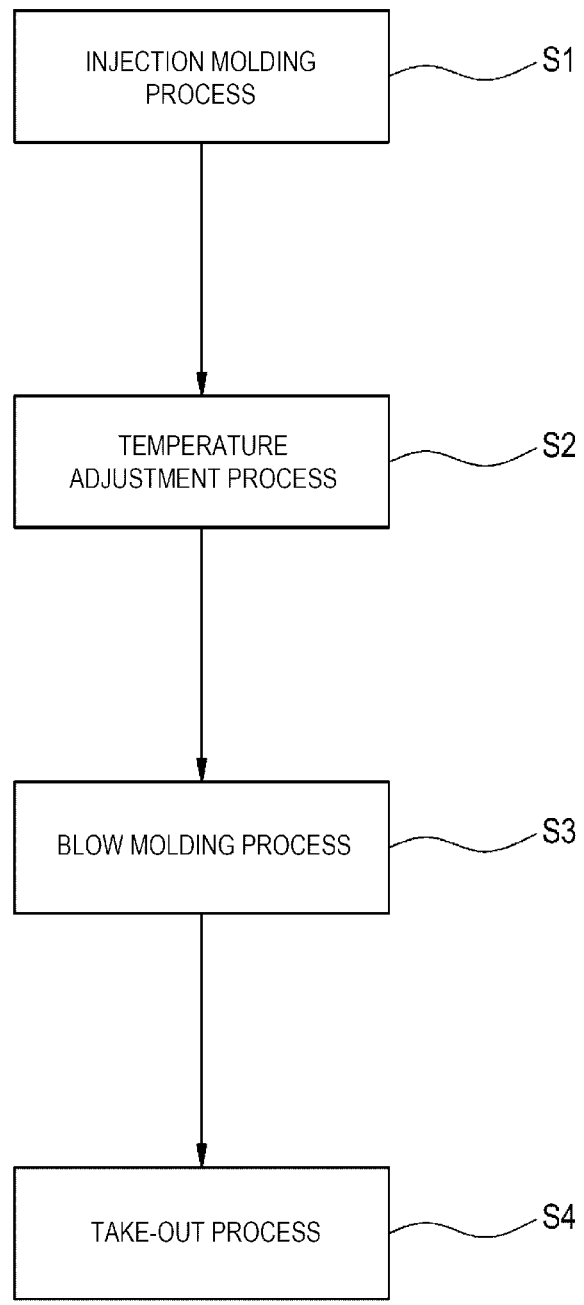
FIG. 6 is a flowchart illustrating a manufacturing method for manufacturing the resin container.

Next, a manufacturing method for manufacturing the resin container 30 according to the embodiment will be described with reference to FIGS. 6 and 2 to 5. FIG. 6 is a flowchart illustrating the manufacturing method for manufacturing the resin container 30. As shown in FIG. 6, the manufacturing method for manufacturing the resin container 30 includes at least an injection molding process S1 of injection-molding the preform 20, a temperature adjustment process S2 of temperature-adjusting the preform 20, a blow molding process S3 of blow-molding the preform 20 to mold the resin container 30, and a take-out process S4.

First, the injection molding process S1 will be described. In the injection molding process S1, the injection molding mold 100 including the neck mold 102, the injection core mold 104, and the injection cavity mold 106 is clamped. Subsequently, a cavity of the clamped injection molding mold 100 is filled with the resin material from the injection device 15 via the hot runner 108.

In the injection molding process S1, the step portion 22 is molded between the neck portion 21 and the body portion 23 of the preform 20. As shown in F2B of FIG. 2, the step portion 22 is molded such that the thickness T2 thereof is at least thicker than the thickness T1 of the engagement groove 21a of the neck portion 21. Further, the step portion 22 is molded such that the outer diameter thereof is at least larger than the outer diameter of the engagement groove 21a of the neck portion 21. Further, the step portion 22 is molded into a state in which the outer wall surface thereof is substantially flush with the outer wall surface of the body portion 23 or into a state in which a reduced diameter portion (for example, a tapered shape) is provided between the outer wall surface of the step portion 22 and the outer wall surface of the body portion 23. Further, the inner wall surface of the body portion 23 is gradually inclined toward the center side of the preform 20 as it goes toward the bottom portion 24 of the preform 20, and the inner diameter of the body portion 23 is gradually narrowed. The body portion 23 may be molded such that the thickness of the body portion 23 gradually increases toward the bottom portion 24.

After the filling of the resin material into the cavity of the clamped injection molding mold 100 is completed, the clamped state is maintained for a predetermined time, and then the clamping is released to mold the preform 20. At this time, in order to cool the resin material filled in the cavity, the cooling medium flows through circulation paths provided in the injection core mold 104 and the injection cavity mold 106. The cooling medium is set within a range of, for example, about 5° C. to about 20° C.

The molded preform 20 is lifted together with the injection core mold 104 and the neck mold 102, and the preform 20 is demolded from the injection cavity mold 106. Subsequently, the injection core mold 104 is further lifted to demold the injection core mold 104 from the preform 20. Then, the preform 20 held by the neck mold 102 is rotated together with the neck mold 102 by the conveyance means 16, and is moved to the temperature adjustment part 12 (temperature adjustment process).

Next, the temperature adjustment process S2 will be described. In the temperature adjustment process S2, first, the preform 20 moved to the temperature adjustment part 12 is accommodated in the temperature adjustment cavity mold 204 by lowering the neck mold 102. Subsequently, the temperature adjustment core mold 202 is lowered to cause the temperature adjustment core mold 202 to abut against an inner surface of the preform 20. Further, the air introduction rod 203 is lowered and inserted into the preform 20. Then, in a state where the first inner flow port 221 is closed, air is fed from the first outer flow port 222 into the preform 20, and a preliminary blow is performed to bring the preform 20 into close contact with an inner wall of the temperature adjustment cavity mold 204. Next, the first inner flow port 221 is opened, and a cooling blow is performed to discharge air to an outside of the preform 20 via the first outer flow port 222 while introducing air from the first inner flow port 221 (FIG. 3). As described above, in the preliminary blow and the cooling blow, flow directions of the air are preferably set to be opposite to each other. The preliminary blow does not necessarily have to be performed. Further, the cooling blow may be a method of discharging air to the outside of the preform 20 via the first inner flow port 221 while introducing air from the first outer flow port 222.

At this time, since air continues to be jetted from the first inner flow port 221, the body portion 23 of the preform 20 is cooled from an inside (inner surface side) by convection of air that flows inside. Simultaneously, by bringing the preform 20 into contact with the temperature adjustment cavity mold 204, the body portion 23 is also cooled from the outside (outer surface side). In this way, the preform 20 is temperature-adjusted to a temperature suitable for blow molding.

When the heater 206 is provided in the upper portion of the temperature adjustment cavity mold 204, a temperature of the step portion 22 can be more precisely controlled since temperature adjustment (heat amount adjustment) can be performed by heating the step portion 22.

After the temperature adjustment, the temperature adjustment core mold 202 and the air introduction rod 203 are lifted to demold the preform 20 from the temperature adjustment core mold 202. Subsequently, the neck mold 102 that holds the preform 20 is lifted to demold the preform 20 from the temperature adjustment cavity mold 204. Then, the preform 20 held by the neck mold 102 is rotated together with the neck mold 102 by the conveyance means 16, and is moved to the blow molding part 13 (blow molding process).

Next, the blow molding process S3 will be described. In the blow molding process S3, as shown in F4A of FIG. 4, the preform 20 is accommodated in the blow cavity mold 306.

Subsequently, as shown in F4B of FIG. 4, while the preform 20 is stretched by the stretch rod 304, blow air is introduced from the blow core mold 302 to expand the preform 20 to the shape of the blow cavity mold 306, thereby molding the resin container 30.

In the blow molding process S3, as shown in FIG. 5, the preform 20 is blow-molded into the resin container 30 such that at least a part (a portion including the upper step portion 22a) of the step portion 22 formed during the injection molding of the preform 20 remains between the neck portion 21 and the shoulder portion 36 of the resin container 30. After the blow molding, the resin container 30 is released from the blow molding mold 300, and the resin container 30 is moved to the take-out part 14.

Incidentally, a hot parison type blow molding method has been devised in which a high cycle is enabled by shortening a cooling time in an injection molding process to demold a preform from an injection mold in a high temperature state and performing post-cooling (additional cooling) and complementing an insufficient cooling amount of the preform in a temperature adjustment process. According to this method, whitening (crystallization) of a crystalline plastic such as PET due to slow cooling can be prevented, and a high-quality container can be manufactured at a high speed.

However, the preform molded by this method has a problem that a lower region of the neck portion (a boundary between the neck portion and the body portion) is easily cooled. This is because the neck portion and the lower region of the neck portion have substantially the same diameter, a thickness of the lower region is substantially the same as a thickness of the thin neck portion, a heat amount (residual heat) in the lower region of the neck portion during injection molding is small, and the heat amount in the lower region of the neck portion is removed via a nearby mold. Further, in this method, since the preform is cooled in the temperature adjustment process in order to maintain the high cycle, it is difficult to perform reheating in the temperature adjustment process, and there is a high possibility that the lower region of the neck portion is further cooled. When a container is formed by blow-molding the preform in a state where the lower region of the neck portion is cooled, a resin residue defect (thickness distribution defect) occurs in a shoulder portion that is a portion corresponding to the lower region of the neck portion. Since the thickness distribution defect occurs in the container, aesthetic appearance and physical properties (strength and rigidity) are reduced. Therefore, in a high-cycle hot parison type blow molding method, it is desirable to develop a method and an apparatus that can prevent the resin residue defect that occurs in the shoulder portion of the container.

In contrast, according to the manufacturing method for manufacturing the resin container including the above processes, since the preform 20 is post-cooled in the temperature adjustment process S2, a cooling time in the injection molding process S1 can be shortened.

Further, in the injection molding process S1, the step portion 22 thicker than at least the engagement groove 21a of the neck portion 21 is formed between the neck portion 21 and the body portion 23 of the preform 20. The step portion 22 corresponding to the lower region of the neck portion is thicker than at least the engagement groove 21a of the neck portion 21. Further, the outer diameter of the step portion 22 is molded to be larger than the outer diameter of the engagement groove 21a of the neck portion 21 of the preform 20.

According to the above configuration, the upper step portion 22a of the step portion 22 that is in contact with the neck mold 102 has a low heat amount retained at a low temperature, but the lower step portion 22b that is not in contact with the neck mold 102 can have a higher heat amount retained by an increased thickness than a preform of a related-art shape. Subsequently, in the blow molding process S3, the preform 20 including the thick step portion 22 in a state where residual heat is high is stretched and blown such that at least a part of the step portion 22 (the portion including at least a part of the upper step portion 22a) remains between the neck portion 21 and the shoulder portion 36 of the resin container 30. Therefore, the portion including the thick lower step portion 22b in a state where the residual heat is high can be favorably stretched and blown to a portion from the neck portion 21 to the shoulder portion 36 of the resin container 30.

Since the outer diameter of the step portion 22 is molded to be larger than the outer diameter of the engagement groove 21a of the neck portion 21 of the preform 20, a space for forming the body portion 22 of the preform 20 to be thick can be secured in the injection cavity 106 without changing a shape of the injection core mold 104.

Incidentally, in order to manufacture a resin container having good appearance and physical properties by the high-cycle hot parison type blow molding method described above, it is desirable to increase a stretch ratio during blow molding by using a preform having a body portion with a large thickness and a short length. However, a related-art design method for making the body portion of the preform thick is a method in which outer wall surfaces of the neck portion and the body portion are made substantially flush with each other (diameters are made substantially the same), and an inner wall surface of the body portion is offset toward a center axis side of the preform. However, as a result, it is necessary to narrow (reduce a diameter of) the injection core mold. Since the cooling medium circulation path is provided inside the injection core mold, the diameter of the injection core mold cannot be narrowed beyond a certain value. Particularly, since the inner diameter of the neck portion is small (for example, 28 mm) in a resin container of a narrow mouth type for accommodating a beverage, cooking oil, and the like, a corresponding injection core mold is also narrow. Therefore, in related-art technique, it is difficult to arbitrarily design the thickness of the body portion of the preform.

In contrast, in the configuration of the present embodiment, the preform 20 is formed into a shape in which the preform 20 is provided with the portion (step portion 22) that protrudes in the outer diameter direction from the lower end of the neck portion 22, and the step portion 22 is connected to the body portion 23. Accordingly, the above-described limitation caused by the injection core mold is eliminated, and the thickness of the body portion 23 of the preform 20 can be arbitrarily designed. In addition, the body portion 23 can also be formed such that the inner wall surface of the body portion 23 is gradually inclined toward the center side of the preform 20 as it goes toward the bottom portion 24 of the preform 20. That is, the inner diameter of the body portion 23 can also be formed so as to gradually decrease as it goes toward the bottom portion 24 of the preform 20. Therefore, it is easy to design the body portion 23 of the preform 20 to be thicker. Since the body portion 23 of the preform is formed to be thick as described above, a high stretch ratio during blow molding can be achieved, and physical properties (strength and rigidity) of the shoulder portion, the body portion, and the like of the resin container 30 can be secured.

As described above, according to the manufacturing method for manufacturing the resin container, it is possible to shorten the molding cycle time by performing the post-cooling in the temperature adjustment process S2, and it is possible to make it difficult for the resin residue defect to occur in the shoulder portion 36 of the resin container 30. Accordingly, the resin container 30 having an appropriate thickness distribution can be manufactured by the high-cycle hot parison type blow molding method.

When the heater 206 is provided, since a temperature of the step portion 22 can also be adjusted by heating (heat amount adjustment), the temperature of the step portion 22 can be more precisely controlled. Accordingly, since the preform 20 can be blow-molded at a more suitable temperature, shaping of the preform 20 in blow molding can be further improved.

According to the manufacturing method for manufacturing the resin container, in the injection molding process 51, the step portion 22 is molded by mold closing surfaces of the inner step defining portion 122 of the injection core mold 104, the outer step defining portion 112 of the neck mold 102, and the outer step defining portion 134 of the injection cavity mold 106. Accordingly, the thick upper step portion 22a can be formed at a portion in contact with the neck mold 102 for a long time. Therefore, for a portion where the heat amount is removed by the mold and the resin residue defect is likely to be caused, it is possible to increase the heat amount retained by forming the thick step portion 22.

According to the manufacturing method for manufacturing the resin container, in the injection molding process S1, the step portion 22 and the body portion 23 of the preform 20 are molded such that the outer wall surfaces thereof are substantially flush with each other. Further, the inner wall surface of the body portion 23 is formed so as to be gradually inclined toward the center side of the preform as it goes toward the bottom portion 24 of the preform 20. Accordingly, while a weight of the resin container 30 is increased and a degree of stretch of the resin container 30 is optimized, for example, the resin container 30 having a wide mouth can be favorably stretched and blown from the neck portion 21 to the shoulder portion 36.

According to the manufacturing apparatus 10 for manufacturing the resin container having the above-described configuration, the same operation and effect as those of the above-described manufacturing method can be obtained.

(Modification)

Figure 7:
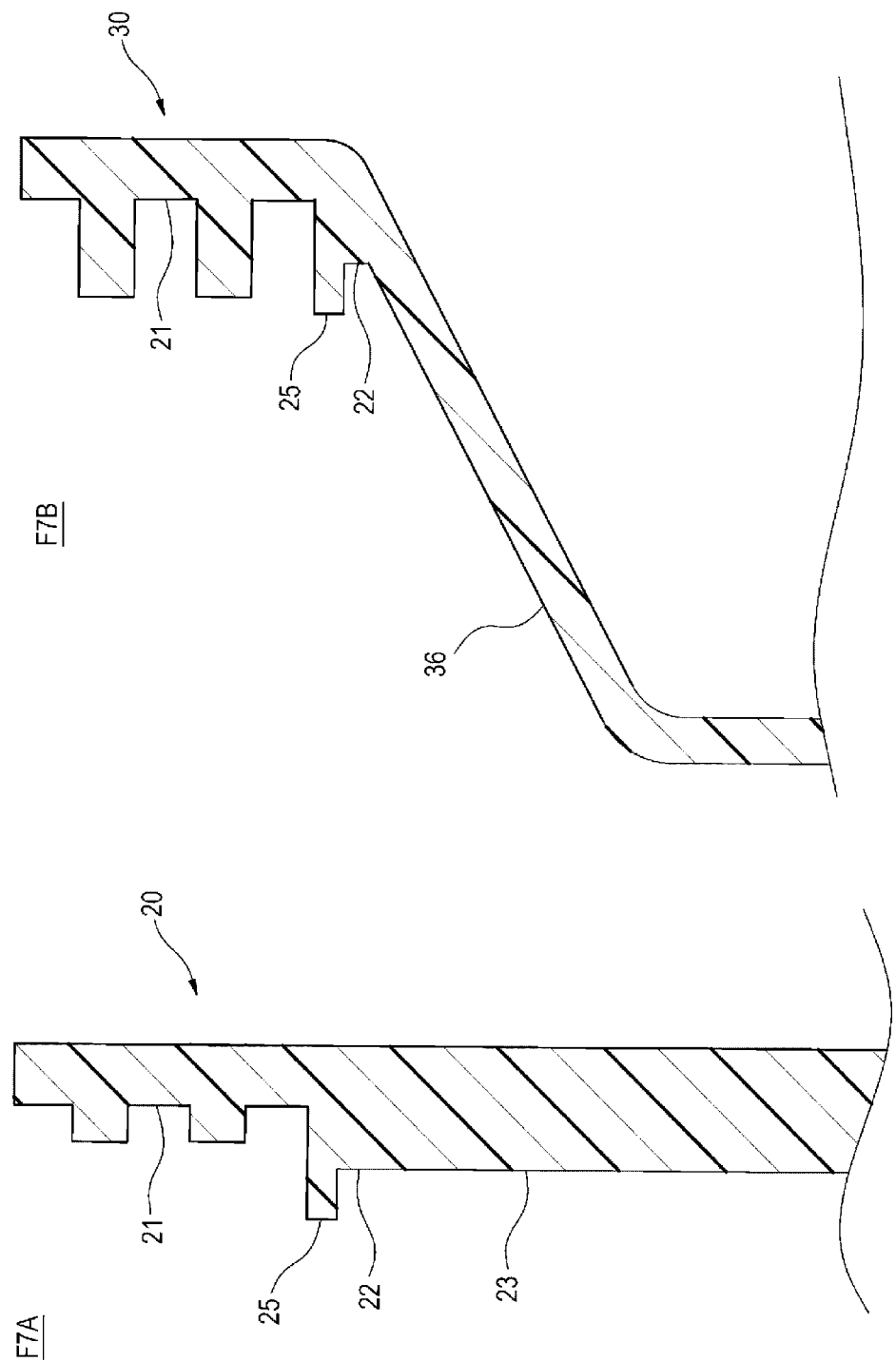
FIG. 7 is a view illustrating a support ring formed on a neck portion.

FIG. 7 is a view illustrating a support ring formed on the neck portion 21. F7A in FIG. 7 is a view showing a convex portion 25 (support ring) formed on the neck portion 21 of the preform 20 by injection molding. F7B in FIG. 7 is a view showing the convex portion 25 (support ring) formed on the resin container 30 manufactured by blow-molding the preform 20 shown in F7A in FIG. 7.

In the injection molding process S1, as shown in F7A in FIG. 7, the convex portion 25 is molded on a part of the neck portion 21 of the preform 20, for example, on a lower end portion of the neck portion 21. The convex portion 25 is molded at the lower end portion of the neck portion 21 and above the step portion 22. The convex portion 25 is a flange-shaped convex portion that protrudes outward from an outer periphery of the neck portion 21. An outer diameter of the convex portion 25 is molded to be larger than an outer diameter of the step portion 22.

In the blow molding process S3, as shown in F7B in FIG. 7, the convex portion 25 is molded above the step portion 22 molded such that at least a part thereof remains between the neck portion 21 and the shoulder portion 36 in the resin container 30.

According to the manufacturing method for manufacturing the resin container including such a process, the resin container 30 including the support ring can also be favorably stretched and blown from the neck portion 21 to the shoulder portion 36 by using heat retained by thickness of the step portion 22.

The present disclosure is not limited to the embodiments described above, and modifications, improvements, and the like can be made as appropriate. In addition, materials, shapes, dimensions, numerical values, forms, numbers, arrangement locations, and the like of constituent elements in the above-described embodiment are arbitrary and are not limited as long as the present disclosure can be achieved.

Figure 8:
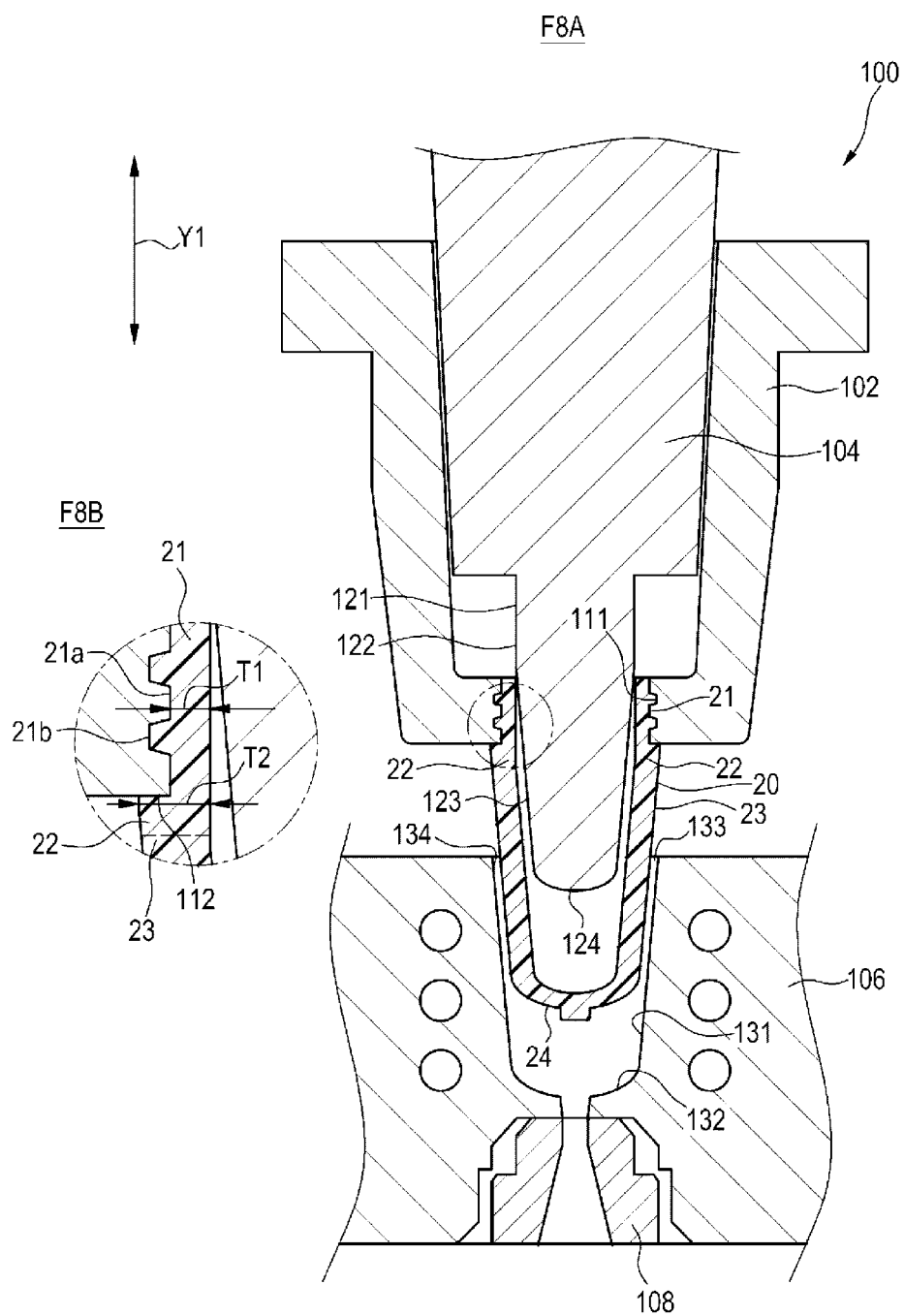
FIG. 8 is a view showing a modification of the injection molding mold.

For example, in the present example, an example in which the outer step defining portion 112 for forming the step portion is formed on the cavity surface of the neck mold 102 has been described, but the present invention is not limited to this example. For example, as shown in FIG. 8, a bottom surface of the neck mold 102 may be formed to be flush, and a part of the bottom surface may function as an outer step defining portion when a side surface (outer step defining portion 134) of the injection cavity mold and an inner surface (inner body defining portion 123) of the injection core mold are combined.

Figure 9:
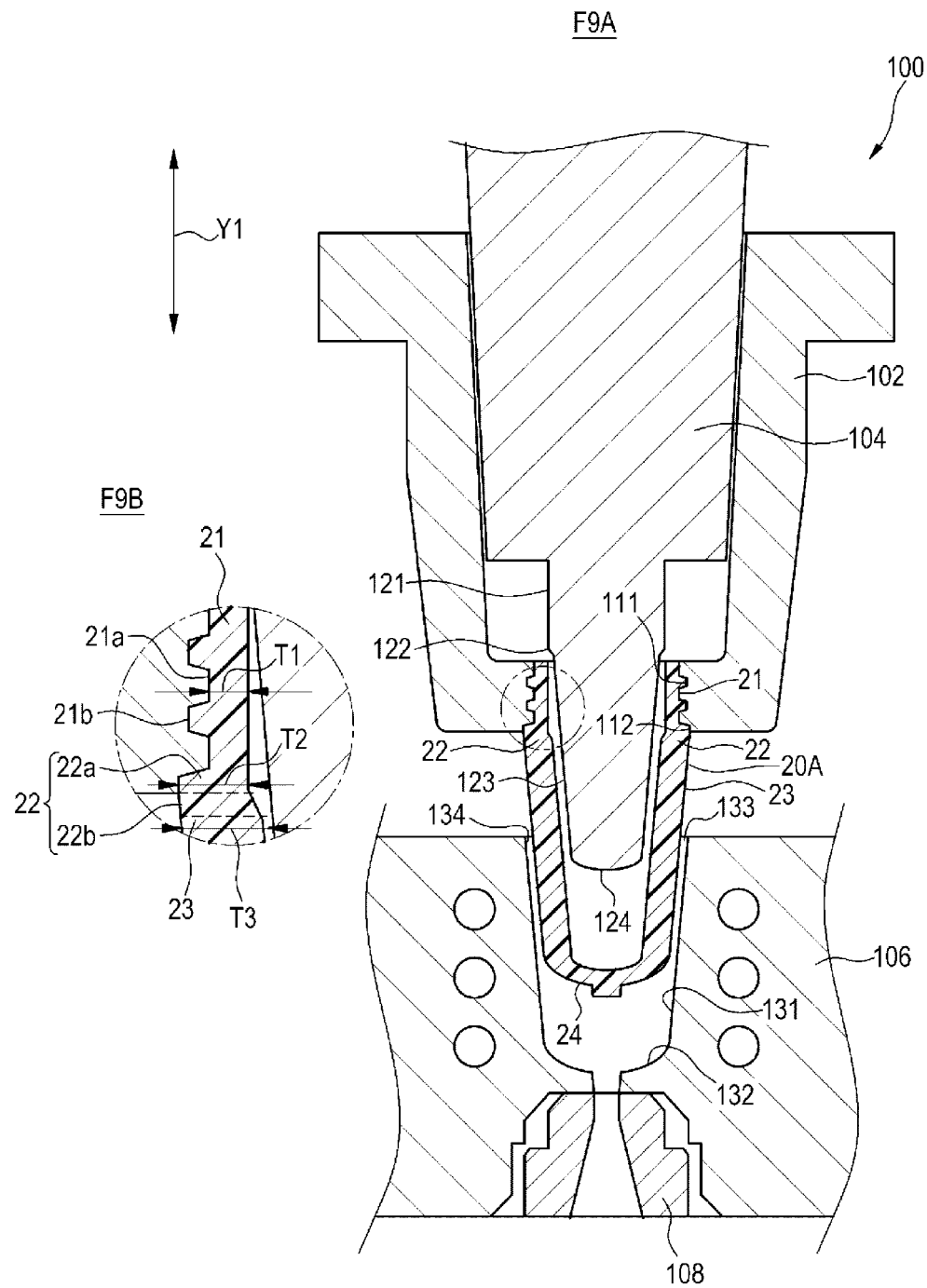
FIG. 9 is a view showing a modification of a preform formed by injection molding.

The shape of the preform formed by injection molding is not limited to the shape described in the present example. For example, as shown in FIG. 9, a thickness T3 of the body portion 23 of a preform 20A may be formed to be thicker than the thickness T2 of an upper end of the step portion 22. At this time, it is desirable that at least the lower step portion 22b of the step portion 22 is formed so as to gradually become thicker as it becomes close to the body portion 23. In the preform 20A of FIG. 9, the lower step portion 22b is formed so as to gradually become thicker from a vicinity of a boundary between the upper step portion 22a and the lower step portion 22b as it becomes close to the body portion 23, but the present invention is not limited to this example. A portion of a starting point where the thickness gradually increases may be on the upper step 22a.

It is desirable that the thickness T2 of the upper end of the step portion 22 is set between 1/3 and 9/10 of the thickness T3 of the body portion 23, and more preferably between 1/2 and 3/5 of the thickness T3 of the body portion 23. The thickness T2 of the upper end of the step portion 22 may be set, for example, between 2.0 mm and 4.0 mm.

The inner diameter of the step portion 22 is set to be equal to or smaller than an inner diameter of the neck portion 21. For example, an inner diameter of the upper step portion 22a is formed to be equal to the inner diameter of the neck portion 21, and an inner diameter of the lower step portion 22b is formed to be smaller than the inner diameter of the neck portion 21. Further, at this time, it is desirable that an inner wall surface of the lower step portion 22b has a tapered shape or a curved shape having a predetermined radius of curvature.

As described above, by forming the inner wall surface of the step portion 22 in a shape that the inner wall surface of the step portion 22 becomes close to a center axis side of the preform as it becomes close to a body portion 23 side (by forming the step portion 22 in a shape such that the step portion 22 gradually becomes thicker as it becomes close to the body portion), the body portion 23 of the preform 22 can be formed to be thicker. Accordingly, residual heat from below the step portion 22 to the body portion 23 is further increased, and a high stretch ratio during blow molding is further easily secured. As a result, it is possible to manufacture the resin container 30 that has an appropriate thickness distribution and that secures physical properties (strength and rigidity) of the shoulder portion, the body portion, and the like, and an aesthetic appearance.

The present application appropriately incorporates the contents disclosed in Japanese Patent Application (Japanese Patent Application No. 2019-177233) filed on Sep. 27, 2019.

The invention claimed is:

1. A manufacturing method for manufacturing a resin container, the manufacturing method comprising:
an injection molding process of injection-molding a resin preform including a neck portion and a body portion;
a temperature adjustment process of temperature-adjusting the injection-molded preform while cooling the injection-molded preform; and
a blow molding process of blow-molding the temperature-adjusted preform to manufacture the resin container,
wherein in the injection molding process,
a step portion thicker than at least an engagement groove of the neck portion is formed between the neck portion and the body portion of the preform, an outer diameter of the step portion being larger than at least an outer diameter of the engagement groove of the neck portion,
wherein in the blow molding process,
the preform is blow-molded such that at least a part of the step portion remains between a neck portion and a shoulder portion of a container blow-molded based on the preform, and
wherein the step portion formed between the neck portion and the body portion of the preform has an upper step portion formed between a neck mold and a core mold, and a lower step portion formed between a cavity mold and the core mold, and an outer diameter of the upper step portion is greater than an outer diameter of the lower step portion.

2. The manufacturing method according to claim 1, wherein in the injection molding process, the step portion is formed by mold closing surfaces of a neck mold and an injection cavity mold.

3. The manufacturing method according to claim 1, wherein in the injection molding process, outer wall surfaces of the step portion and the body portion of the preform are substantially flush with each other, and an inner wall surface of the body portion is gradually inclined toward a center side of the preform as it goes toward a bottom portion of the preform.

4. The manufacturing method according to claim 1, wherein in the injection molding process, a convex portion that protrudes outward is formed on a part of the neck portion of the preform, and an outer diameter of the convex portion is formed to be larger than the outer diameter of the step portion.

5. The manufacturing method according to claim 1, wherein in the temperature adjustment process, the body portion of the preform is simultaneously cooled from an inner side and an outer side.

6. A manufacturing apparatus for manufacturing a resin container, the manufacturing apparatus comprising:
an injection molding part configured to injection-mold a resin preform including a neck portion and a body portion;
a temperature adjustment part configured to temperature-adjust the injection-molded preform while cooling the injection-molded preform; and
a blow molding part configured to blow-mold the temperature-adjusted preform to manufacture the resin container,
wherein the injection molding part is configured to form a step portion thicker than the neck portion between the neck portion and the body portion of the preform, an outer diameter of the step portion being larger than at least an outer diameter of an engagement groove of the neck portion of the preform,
wherein the temperature adjustment part is configured to simultaneously cool the body portion of the preform from an inner side and an outer side of the body portion, and the blow molding part is configured to blow-mold the preform such that at least a part of the step portion remains between a neck portion and a shoulder portion of a container blow-molded based on the preform, and
wherein the step portion configured to be formed by the injection molding part between the neck portion and the body portion of the preform has an upper step portion formed between a neck mold and a core mold, and a lower step portion formed between a cavity mold and the core mold, and an outer diameter of the upper step portion is greater than an outer diameter of the lower step portion.

* * * * *